United States Patent
Kurita

Patent Number: 6,067,207
Date of Patent: *May 23, 2000

[54] RECORDING AND/OR REPRODUCING APPARATUS INCLUDING A SLIDER WITH AN INCLINED GUIDE AT A FRONT END PORTION THEREOF

[75] Inventor: Kazuhito Kurita, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/875,021

[22] PCT Filed: Nov. 18, 1996

[86] PCT No.: PCT/JP96/03379

§ 371 Date: Jul. 9, 1997

§ 102(e) Date: Jul. 9, 1997

[87] PCT Pub. No.: WO97/19450

PCT Pub. Date: May 29, 1997

[30] Foreign Application Priority Data

Nov. 17, 1995  [JP]  Japan ...................... 7-299953

[51] Int. Cl.[7] ...................................................... G11B 5/54
[52] U.S. Cl. ............................................................. 360/105
[58] Field of Search ..................... 360/103, 104, 360/105, 106; 369/13, 75.2, 77.2

[56] References Cited

U.S. PATENT DOCUMENTS

| | | | |
|---|---|---|---|
| 5,572,497 | 11/1996 | Kim et al. | 369/77.2 |
| 5,590,098 | 12/1996 | Eom | 369/13 |
| 5,677,897 | 10/1997 | Anada et al. | 369/13 |
| 5,682,280 | 10/1997 | Takahashi et al. | 360/105 |
| 5,684,777 | 11/1997 | Fukuyama et al. | 369/77.2 |

FOREIGN PATENT DOCUMENTS 7-282485  10/1995  Japan .

*Primary Examiner*—William R. Korzuch
*Attorney, Agent, or Firm*—Limbach & Limbach L.L.P.

[57] ABSTRACT

A magnetic head device provided with a magnetic head adapted to be in contact with the disc on which information signals are recorded and to be away therefrom. This magnetic head device comprises a slider to which the magnetic head is attached, a supporting member in which the slider is provided at one end side and the other end side is attached to a fixed portion, and a guide portion provided at the slider in a manner inclined at a predetermined elevation angle from the other end side toward one end side of the supporting member. By providing the inclined guide portion at the slider, collision with the disc cartridge inserted in a manner opposite to the slider can be prevented. When the slider is in contact with the disc, or is away therefrom, collision with the opening portion peripheral edge provided at the disc cartridge can be prevented.

14 Claims, 6 Drawing Sheets

RECORDING AND/OR REPRODUCING APPARATUS INCLUDING A SLIDER WITH AN INCLINED GUIDE AT A FRONT END PORTION THEREOF

TECHNICAL FIELD

This invention relates to a magnetic head device used in a recording and/or reproducing apparatus using a disc-shaped recording medium such as a magneto-optical disc, etc. as a recording medium, and a recording and/or reproducing apparatus for a disc-shaped recording medium using such a head device.

BACKGROUND ART

Hitherto, there have been used magneto-optical discs capable of recording and/or reproducing, by using light beams and the external magnetic field, musical signals or information signals such as data, etc. processed in the computer.

Such magneto-optical discs are adapted so that recording of information signals is carried out at an extremely high density. For this reason, in the magneto-optical discs, errors in the recording and/or reproduction of information signals are caused by slight attachment of dust, or damage or impairment with respect to the signal recording area, thus failing to carry out precise recording and/or reproduction of information signals.

In view of the above, the magneto-optical discs are constituted as a disc cartridge in a manner rotatably accommodated within a cartridge body in which a pair of upper and lower halves are butt-joined. Thus, such magneto-optical discs are loaded into the recording and/or reproducing apparatus (hereinafter referred to as recording and/or reproduction unit as occasion may demand) in the state where they remain within the respective cartridge bodies, and are stored in the state where they remain within the respective cartridge bodies.

The magneto-optical disc accommodated within the disc cartridge is adapted so that the disc cartridge is loaded with respect to the cartridge loading portion within the unit body, the magneto-optical disc is loaded with respect to the disc rotational operation mechanism disposed within the unit body, and is caused to undergo rotational operation by the disc rotational operation mechanism. By irradiating light beams emitted from the optical pick-up unit onto the signal recording portion of the magneto-optical disc placed in the state where it has been caused to undergo rotational operation by the disc rotational operation mechanism, and applying an external magnetic field magnetically modulated in accordance with a desired information signal to be recorded from the magnetic head device, recording of the desired information signal is carried out.

On the other hand, by irradiating light beams emitted from the optical pick-up unit onto the signal recording portion of the magneto-optical disc placed in the state where it has been caused to undergo rotational operation by the disc rotational operation mechanism, and detecting return light reflected from the magneto-optical disc by means of a photo-detector provided at the optical pick-up unit, reading operation of information signals recorded on the magneto-optical disc is carried out.

As stated above, in the recording/reproduction unit using the magneto-optical disc as a recording medium and adapted to have the ability to record/reproduce information signals, the magnetic head device for applying an external magnetic field magnetically modulated in accordance with an information signal to be recorded onto the magneto-optical disc is used.

As a magnetic head device used in the recording/reproduction unit of this kind, a magnetic head device constituted as shown in FIGS. 1 and 2 is used.

This magnetic head device 152 is attached through a connection plate connected to an optical pick-up unit supported on the chassis where the mechanical parts such as the disc rotational operation mechanism, etc. are disposed so that it can be moved. As the result of the fact that the magnetic head device 152 is connected to the optical pick-up unit through the connection plate, it is caused to undergo movement operation in the radial direction of a magneto-optical disc 150 caused to undergo rotational operation by the disc rotational operation mechanism in synchronism with the optical pick-up unit.

The magnetic head device 152 constituting the recording/reproduction means for information signals along with the optical pick-up unit is of a structure including, as main constituent members, as shown in FIGS. 1 and 2, a rotational supporting plate 153 of which base end portion side is rotatably supported by connection plate (not shown), a head supporting plate 154 having elasticity in which the base end portion side thereof is supported by the front end side of the rotational supporting plate 153, a limiting plate 155 adapted for limiting the rotational position of the head supporting plate 154 to limit excessive displacement of the head supporting plate 154, and a slider 156 and a magnetic head 157 attached to the head supporting plate 154.

The rotational supporting plate 153 constituting this magnetic head device 152 is rotationally biased in a clockwise direction which is the direction indicated by arrow $A_1$ in FIG. 1 by torsion spring (not shown) provided at the supporting portion. Further, the head supporting plate 154 is formed by punching a thin metallic elastic plate so as to take an elongated rectangular shape, and is attached in the cantilever state by connecting its base end portion to the free end portion of the rotational supporting plate 153.

In this example, the limiting plate 155 is connected to the rotational supporting plate 153 in such a manner that the base end portion side is stacked on the head supporting plate 154.

Moreover, at the front end portion side of the head supporting plate 154, an attachment portion 154a for attaching the slider 156 is provided. This attachment portion 154a is formed by punching the front end portion of the head supporting plate 154 so as to take substantially channel shape. Further, at the front end portion of the head supporting plate 154, there is attached the slider 156 to which the magnetic head 157 is attached through the head attachment portion 154a.

Further, the slider 156 is formed by molding synthetic resin material having abrasion resistance, and is composed, as shown in FIG. 3, of a substantially rectangular tubular slider body 158 where there is formed a recessed portion 159 for attachment of head within which the magnetic head 157 is fitted, and a disc slidable contact portion 160 integrally provided in a projected manner (hereinafter simply referred to as projected as occasion may demand) at the front end portion of the slider body 158. At the bottom surface opposite to the magneto-optical disc 150 of the head attachment recessed portion 159, an opening portion 159a is provided. In addition, the magnetic head 157 is attached to the slider 156 in such a manner that it is accommodated within the recessed portion 159, and is opposed to the signal recording surface of the magneto-optical disc 150 through the opening portion 159a when the magnetic head device 152 is attached to the recording/reproduction unit.

In this example, the slider 156 is attached in such a manner that the upper surface side opposite to the surface slidably in contact with the magneto-optical disc 150 of the disc slidable contact portion 160 is welded, etc. to the attachment portion 154a provided at the head supporting plate 154. This slider 156 is stably supported as the result of the fact that when it is attached to the head supporting plate 154, holding portions 158a projected on the both sides of the upper end side of the slider body 158 are held at the upper surface side of the head supporting plate 154.

On the other hand, at the disc cartridge within which the magneto-optical disc 150 is accommodated, there is provided an opening portion for recording into which the slider 156 provided at the front end portion of the magnetic head device 152 is admitted. This opening portion is ordinarily closed by the shutter member to thereby prevent that dust, etc. is admitted into the cartridge body so that it is adhered onto the signal recording surface of the magneto-optical disc 150. This disc cartridge is adapted so that when loading operation with respect to the cartridge loading portion of the recording/reproduction unit is carried out, the shutter member is moved by the shutter opening member so that the opening portion is opened, whereby a portion of the information signal recording surface of the magneto-optical disc 150 accommodated within the cartridge body is faced toward the external along the radial direction.

Further, when the disc cartridge is loaded with respect to the cartridge loading portion of the recording/reproduction unit, the magnetic head device 152 is admitted into the disc cartridge from the opened opening portion for recording, resulting in the state where the disc slidable contact surface of the disc slidable contact portion 160 at the front end portion side of the slider 156 is lightly in touch with the signal recording surface of the magneto-optical disc as shown in FIG. 2. Further, when the recording operation is carried out, the magnetic head device 152 serves to apply external magnetic field to the information signal recording surface of the magneto-optical disc 150 through the opening portion 159a from the magnetic head 157 fitted (mounted) within the slider 156 to carry out recording of information signals. At this time, light beams are irradiated from the optical pick-up unit to the portion to which the magnetic head 157 is opposed.

Meanwhile, in order to prevent collision with the disc cartridge when the disc cartridge is loaded with respect to the cartridge loading portion of the recording/reproduction unit, the magnetic head device 152 is ordinarily held at the position withdrawn from the cartridge loading portion. Accordingly, at the recording/reproduction unit, there is provided a vertical movement mechanism for carrying out vertical movement (movement in upper and lower directions) of the magnetic head device 152 within the range between a withdrawal position as shown in FIG. 1 and a position in contact with the magneto-optical disc 150 as shown in FIG. 2. Although the detail is omitted, the vertical movement mechanism comprises a head lift lever 151 for moving the magnetic head device 152 against elastic force rendered (applied) to the above-described rotational supporting plate 153 to the position caused to be away (spaced) from the cartridge loading portion when the disc cartridge is loaded with respect to the cartridge loading portion.

In this example, the magnetic head device 152 is adapted so that when it is moved to the position withdrawn from the cartridge loading portion as shown in FIG. 1, the head supporting plate 154 is supported by a limiting portion 155a provided at the front end portion of the limiting plate 155 so that excessive elastic displacement is limited.

Further, in the state where no disc cartridge is loaded with respect to the cartridge loading portion, as shown in FIG. 1, the head lift lever 151 comes into contact with the lower surface of the rotational supporting plate 153 to thereby push this rotational supporting plate 153 in upward direction against biasing force of the torsion spring. In addition, the head lift lever 151 is adapted so that when the disc cartridge is loaded with respect to the cartridge loading portion, it is rotationally operated (actuated) in the downward direction to release the pushing-up state of the rotational supporting plate 153. The magnetic head device 152 is thus rotationally operated (actuated) as a whole through the rotational supporting plate 153, resulting in the state where the disc slidable contact portion 160 at the front end portion of the slider 156 is lightly in touch with the signal recording surface of the magneto-optical disc 150 as described above.

Meanwhile, in the above-described magnetic head device 152, since the slider 156 having mass is attached to the front end portion of the head supporting plate 154 cantilever-supported by the rotational supporting plate 153, the position in upper and lower directions of the slider 156 becomes unstable by vibration of the head supporting plate 154. Moreover, the head supporting plate 154 is such that in the case where the recording/reproduction unit is fallen down, etc., the head supporting plate 154 may be slightly bent by that impact so that it is deformed.

Further, since the magnetic head device 152 is constituted by combining (assembling) members such as the rotational supporting plate 153 and the head supporting plate 154, etc. as described above, the position in upper and lower directions of the slider 156 becomes unstable also by dimensional accuracy and/or assembling accuracy of these respective members, etc.

For this reason, in the magnetic head device 152, there might take place the state where the slider 156 is positioned in a manner faced to the loading area of the disc cartridge without being held at the withdrawal position spaced from the cartridge loading portion. Accordingly, in the magnetic head device 152, there may take place an inconvenience such that the slider 156 collides with the disc cartridge to be loaded. As a result, this may leads to such an accident or failure that non-smooth movement or collision with any portion constituting the magnetic head device, i.e., the slider 156 in the insertion/withdrawal operation of the disc cartridge is caused to take place, but also the head supporting plate 154 formed by thin metallic plate having elasticity is damaged.

Moreover, in the magnetic head device 152, also in the case where the slider 156 is held at the position withdrawn from the loading area of the disc cartridge with respect to the cartridge loading portion, there is the possibility that the slider 156 may collide with the disc cartridge as the result of the fact that, e.g., the disc cartridge is loaded in an inclined state, whereby the above-described problem takes place.

In order to prevent occurrence of such problem, there is employed, in the recording/reproduction unit, a configuration in which the magnetic head device 152 is withdrawn and positioned with a sufficiently broad spacing with respect to the cartridge loading portion by the head lift lever 151 of the above-described head vertical movement mechanism. For this reason, the recording/reproduction unit is caused to have large thickness dimension. As a result, it would become difficult to realize miniaturization thereof.

Further, when eject operation is carried out so that the loaded disc cartridge is pulled or withdrawn out from the cartridge loading portion, the magnetic head device 152 is operated (actuated) upwardly so that it is withdrawn from the opening portion for recording. In this case, for the purpose of preventing holding of the slider 156 by the shutter member, the magnetic head device 152 is caused to undergo movement operation in a manner preceding to the movement operation of the disc cartridge and up to the position where the slider 156 is sufficiently withdrawn from the loading area of the disc cartridge with respect to the cartridge loading portion.

Meanwhile, in the case of the above-mentioned magnetic head device 152, in this eject operation, the state where the slider 156 is positioned in a manner facing the loading area of the disc cartridge takes place resulting from the fact that the position in upper and lower directions of the above-described slider 156 is brought into unstable state. For this reason, in the magnetic head device 152, there were instances where an inconvenience such that the back end portion of the slider 156 collides with the recording opening portion of the disc cartridge to be ejected. Such a phenomenon would also lead to an accident or failure such that non-smooth movement or collision of the disc cartridge is caused to take place or the head supporting plate 154 is broken.

SUMMARY OF THE INVENTION

An object of this invention is provide a magnetic head device capable of eliminating the above-described problems that the conventional magnetic head device has and a recording and/or reproducing apparatus provided with such a head device.

Another object of this invention is to provide a magnetic head device which can be securely protected (from various inconveniences) and can realize reliable loading/withdrawal operation of the disc cartridge, and a recording and/or reproducing apparatus provided with such a magnetic head device.

A further object of this invention is to provide a magnetic head device and a recording and/or reproducing apparatus which can securely realize loading/withdrawal of the disc-shaped recording medium while allowing the amount of movement with respect to the disc-shaped recording medium loaded with respect to the loading portion of the recording medium to be small, thus to attain thin structure and miniaturization of the recording/reproduction apparatus itself.

A magnetic head device according to this invention proposed for the purpose of attaining objects as described above is of a structure comprising a magnetic head, a slider to which the magnetic head is attached, a supporting member in which the slider is provided at one end side thereof and the other end side thereof is attached to a fixed portion, and a guide portion provided at the slider in such a manner inclined at a predetermined elevation angle from the other end side toward one end side of the supporting member.

In this case, the guide portion provided at the slider includes an inclined surface inclined at a predetermined elevation angle from the other end side toward one end side of the supporting member.

Moreover, a recording and/or reproducing apparatus for a disc-shaped recording medium according to this invention proposed for the purpose of attaining objects as described above comprises a slider to which a head is attached, a supporting member adapted so that the slider is attached to one end side thereof and the other end side thereof is attached to a fixed portion, and the head attached to the slider is moved between a first position where it becomes close to the disc-shaped recording medium and a second position where it becomes away (spaced) from the disc-shaped recording medium, and a guide portion provided at the front end portion of the slider and adapted so that when the disc-shaped recording medium is inserted into the apparatus body, it comes into contact with the disc-shaped recording medium to move the supporting member in a direction of the second position.

This guide portion includes an inclined surface inclined in a direction away (spaced) from the disc-shaped recording medium from the other end side toward one end side of the supporting member.

Further, the recording and/or reproducing apparatus for disc-shaped recording medium according to this invention further comprises a recording and/or reproduction unit for carrying out recording and/or reproduction with respect to the disc-shaped recording medium, and a holder moving in the state where it holds the disc-shaped recording medium inserted into the apparatus body to allow the disc-shaped recording medium to undergo loading with respect to the recording and/or reproduction unit. At this holder, an opening portion to which the magnetic head or the slider is faced is formed.

In addition, the supporting member for supporting the slider to which the head is attached is adapted so that when allowing the disc-shaped recording medium to undergo loading with respect to the recording and/or reproduction unit by the holder, the guide portion positioned within the holder and the disc-shaped recording medium are in contact with each other from the opening portion provided at the holder, whereby the supporting member is rotated in a direction of the second position, while when ejecting the disc-shaped recording medium loaded with respect to the recording and/or reproduction unit by the holder, the supporting member is greatly rotated in the direction of the second position in accordance with movement of the holder.

BEST MODE FOR CARRYING OUT THE INVENTION

A magnetic head device and a recording/reproducing apparatus using, as a recording medium, a magneto-optical disc as a disc-shaped recording medium according to this invention will be described below with reference to the attached drawings.

Figure 1:
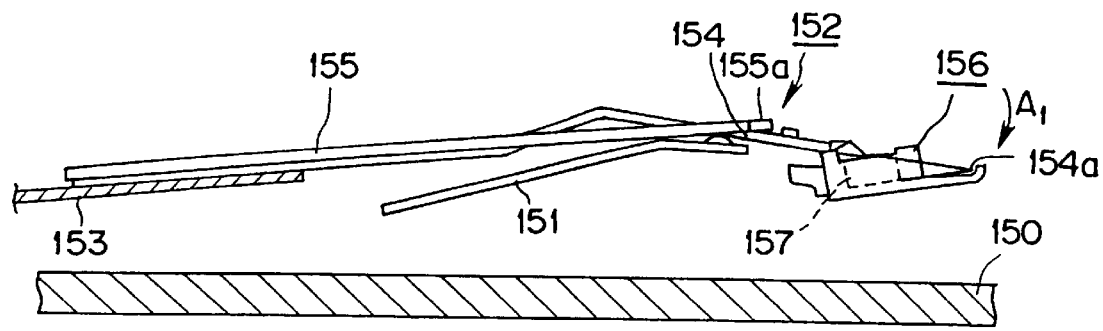
FIG. 1 is an essential part side view showing a conventional magnetic head device used in a recording/reproducing apparatus using magneto-optical disc as recording medium, wherein the state where magnetic head is spaced from the magneto-optical disc is shown.
Figure 2:
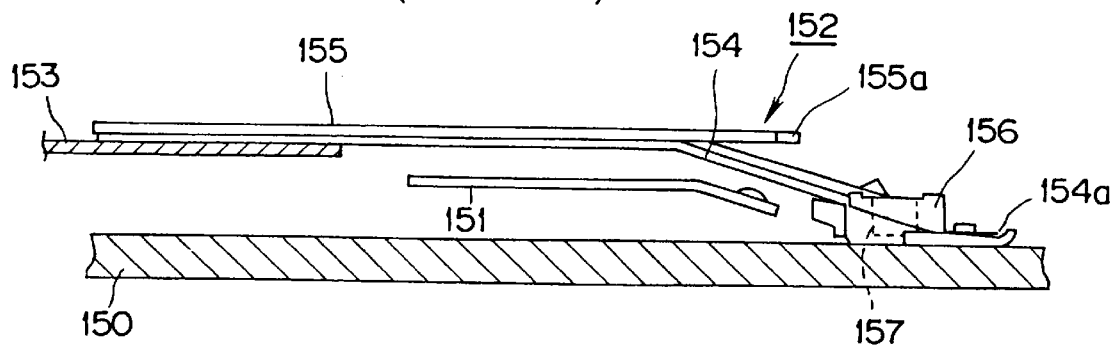
FIG. 2 is an essential part side view of a magnetic head device showing the state where the magnetic head is close to the magneto-optical disc so that recording of information signals can be made.
Figure 3:
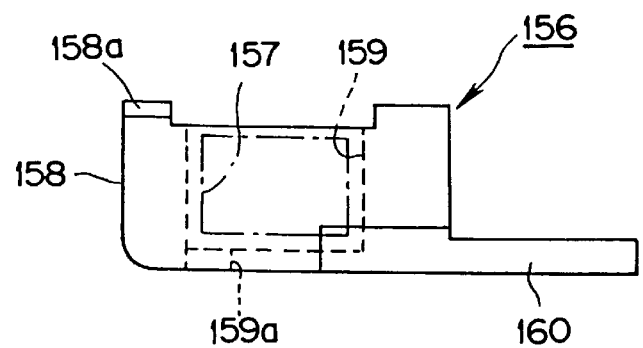
FIG. 3 is a side view showing slider to which the magnetic head constituting the magnetic head device is attached.
Figure 4:
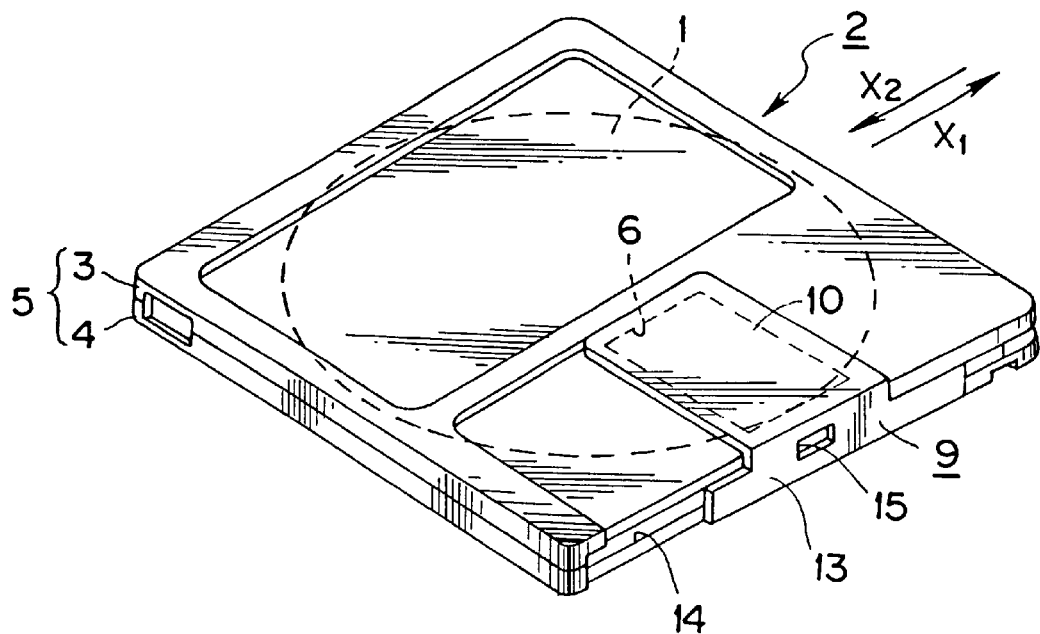
FIG. 4 is a perspective view when a disc cartridge used as a recording medium for a recording/reproducing apparatus according to this invention is viewed from the upper surface side.
Figure 5:
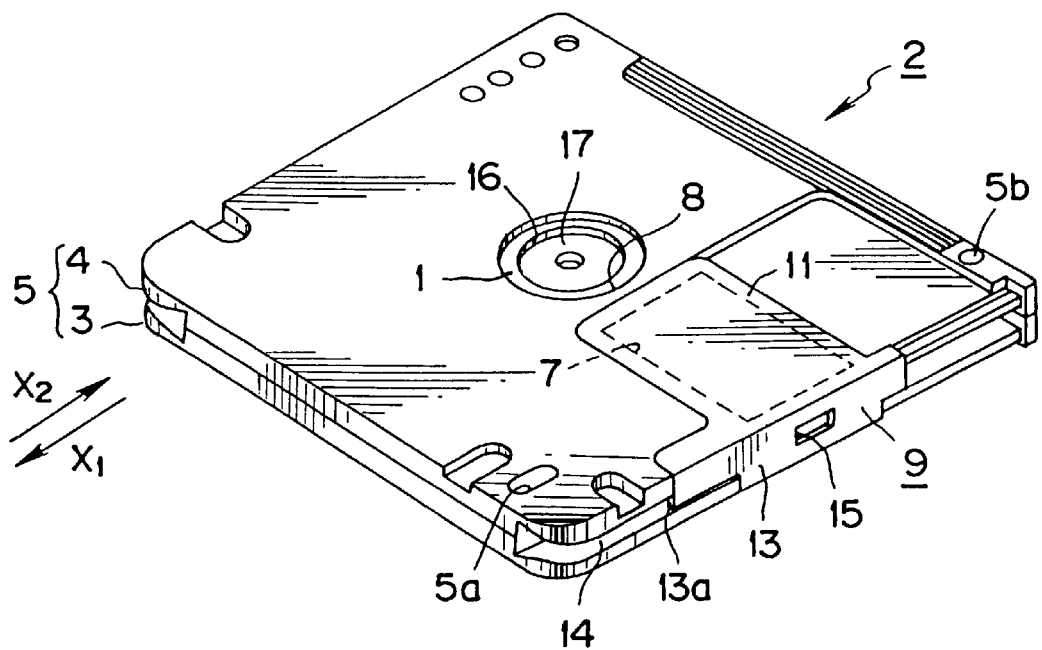
FIG. 5 is a perspective view when the disc cartridge is viewed from the lower surface side.

The recording/reproducing apparatus (recording/reproduction unit) to which the magnetic head device according to this invention is applied uses a disc cartridge 2 within which a magneto-optical disc 1 which permits re-recording of information signals is accommodated as a recording medium. This disc cartridge 2 is adapted to rotatably accommodate the magneto-optical disc 1 within a rectangular cartridge body 5 in which a pair of upper and lower halves 3, 4 are butt-joined. At the upper surface side of the cartridge body 5, as shown in FIG. 4, an opening portion 6 for recording into which magnetic head is admitted as described later is formed. Moreover, at the lower surface side of the cartridge body 5, as shown in FIG. 5, an opening portion 7 for optical pick-up unit is formed in a manner opposite to the opening portion 6 for magnetic head. The magneto-optical disc 1 accommodated within the cartridge body 5 is adapted so that a portion of the recording/reproduction area is faced toward the external extending in the radial direction through the respective opening portions 6, 7. Further, at the central portion of the lower surface side of the cartridge body 5, there is formed a central opening portion 8 for circular disc table into which disc table of the disc rotational operation mechanism for rotationally operating the magneto-optical disc 1 is admitted.

In addition, a shutter member 9 for opening and closing the respective opening portions 6, 7 is attached at the cartridge body 5. This shutter member 9 is formed by punching and bending thin metallic plate, and is composed of shutter plates 10, 11 having sizes (dimensions) sufficient to cover the respective opening portions 6, 7 and a connection piece 13 for connecting the base end portions of these shutter plates 10, 11. In this example, the shutter member 9 is formed so as to take substantially channel shape as a whole. The shutter member 9 formed in this way is attached to the front side of the cartridge body 5 in such a manner that the respective shutter plates 10, 11 cover the respective opening portions 6, 7, and is moved along the front side to thereby open or close the respective opening portions 6, 7. The shutter member 9 is adapted so that an engagement piece 13a provided at the connection piece 13 is engaged with a movement guide groove 14 formed at the front side of the cartridge body 5, whereby the engagement piece 13a is guided by the movement guide groove 14 so that stable movement is guaranteed.

In the disc cartridge 2 constituted as described above, insertion/withdrawal with respect to the recording/reproduction unit is carried out with one side surface perpendicular to the front side where the shutter member 9 is moved being as insertion end. Namely, the disc cartridge 2 is caused to undergo insertion/withdrawal with respect to the recording and/or reproduction unit with the directions indicated by arrows $X_1$, $X_2$ in FIGS. 4 and 5 being as the insertion/withdrawal directions.

Moreover, at the central portion of the connection piece 13 of the shutter member 9, there is provided an engagement hole 15 with which there is engaged a shutter closing operation member provided at the recording/reproduction unit side for allowing the shutter member 9 moved to the position where it opens the respective opening portions 6, 7 in allowing the disc cartridge 2 to undergo eject operation from the recording/reproduction unit to undergo movement operation in a positional direction to close it.

Meanwhile, in the magneto-optical disc 1 accommodated within the disc cartridge 2, a center hole 16 is formed at the central portion thereof. A hub 17 is attached in a manner to close this center hole 16. The hub 17 is formed by metallic material having magnetism which can be attracted with respect to the magnet disposed on the disc table. The center hole 16 and the hub 17 are faced toward the external through the central opening portion 8 for disc table of the cartridge body 5.

Figure 6:
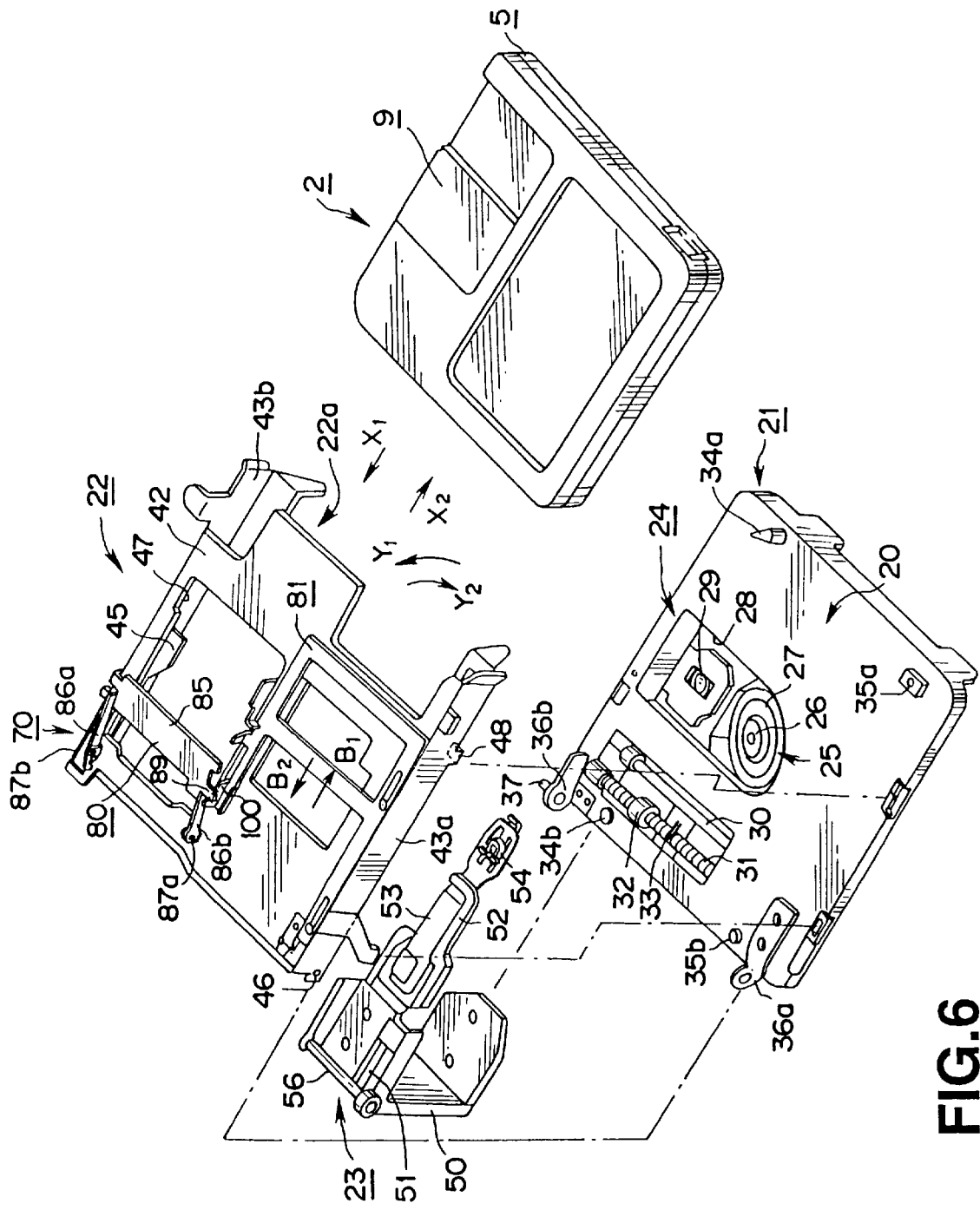
FIG. 6 is an exploded perspective view of a magnetic head device and the recording/reproducing apparatus provided with this magnetic head device according to this invention.

In the recording/reproduction unit according to this invention using the disc cartridge 2 constituted as described above as a recording medium, a chassis 21 where a cartridge loading portion 20 is constituted on the upper surface side is disposed, as shown in FIG. 6, within an outer casing constituting the unit body. A cartridge holder 22 for holding the disc cartridge 2 and allowing the disc cartridge 2 to undergo loading/withdrawal with respect to the cartridge loading portion 20 is rotatably supported through the chassis 21. Moreover, an optical pick-up unit 24 is supported on the chassis 21, and a magnetic head device 23 to which this invention is applied is disposed in a manner connected to the optical pick-up unit 24. Further, on the chassis 21, there is disposed a disc rotational operation mechanism 25 for allowing the magneto-optical disc 1 accommodated within the disc cartridge 2 loaded with respect to the cartridge loading portion 20 to undergo rotational operation.

In this example, as shown in FIG. 6, the chassis 21 is formed by metallic material as a rectangular flat plate, and has a size (dimensions) slightly greater than the outside dimension of the principal surface of the disc cartridge 2.

The disc rotational operation mechanism 25, the optical pick-up unit 24 and the magnetic head device 23 are disposed on the chassis 21 where the cartridge loading portion 20 is constituted on the upper surface side. Thus, the recording/reproduction unit is constituted.

Further, the disc rotational operation mechanism 25 disposed substantially at the central portion of the chassis 21 is composed of a drive motor (not shown) disposed at the lower surface side of the chassis 21, and a disc table 27 attached on a drive shaft 26 of the drive motor and disposed at the upper surface side of the chassis 21. This disc table 27 is formed in such a manner that the entirety thereof takes disc shape, and magnet is disposed within the disc table 27. In addition, this disc table 27 is adapted so that when the disc cartridge 2 is loaded with respect to the cartridge loading portion 20, it magnetically attracts the hub 17 of the disc cartridge 2 to clamp the magneto-optical disc 1 so that it rotates in one body therewith.

In this example, at the outer casing constituting the unit body, there are provided, a key input section, e.g., power turn-ON button for driving the recording/reproduction unit, recording button for selecting any one of various operation modes, reproduction button, temporary stop button., stop button, sound volume adjustment button and eject button, etc., and a display section for displaying address of information signal being reproduced, etc. The key signal input section and the display section constituted as described above are controlled by CPU (Central Processing Unit) disposed within the outer casing. Further, this CPU controls, on the basis of a signal from the key signal input section, the recording/reproduction unit composed of the disc rotational operation mechanism 25, the magnetic head device 23 and the optical pick-up device 24, etc. In addition, a cover body rotationally operated in a manner interlocking with the cartridge holder 22 for allowing the disc cartridge 20 to undergo loading operation is attached at the outer casing.

Moreover, at the chassis 21, there is provided an opening portion 28 for pick-up for facing the optical pick-up unit 24 toward the external in a manner adjacent to the disc rotational operation mechanism 25. This pick-up opening portion 28 is formed in correspondence with the movement area of the optical pick-up unit 24 so that when the disc cartridge 2 is loaded with respect to the cartridge loading portion 20 in the state where the shutter member 9 thereof opens the respective opening portions 6, 7 of the cartridge body 5, the optical pick-up unit 24 can be moved extending over inner and outer circumferences of the magneto-optical disc 1 faced toward the external of the cartridge body 5 through the opening portion 7.

Further, the optical pick-up unit 24 disposed so that it can be moved on the chassis 21 includes an optical block section, and a light source comprised of semiconductor laser, etc., and an optical device and an object lens (objective) 29 for guiding light beams emitted from the light source onto the disc 1 are provided within the optical block section. This optical pick-up unit 24 is constituted so as to have ability of converging and irradiating light beams emitted from the light source onto the signal recording layer of the magneto-optical disc 1 through the optical device and the object lens 29. Moreover, this optical pick-up unit 24 detects, through the object lens 29 and the optical device, a reflected light of light beams irradiated onto the magneto-optical disc 1 to thereby carry out read-out operation of information signals recorded on the magneto-optical disc 1.

In addition, the optical pick-up unit 24 detects a focus error signal and a tracking error signal from a reflected light reflected from the magneto-optical disc 1 to drive the biaxial actuator in accordance with these error signals to thereby drive the object lens 29 so that its position is caused to undergo displacement thus to carry out the focusing control and the tracking control.

The optical pick-up unit 24 constituted in this way is attached so that it can be moved through guide shafts 30 attached in parallel to each other at the lower surface side of the chassis 21. Further, this optical pick-up unit 24 is caused to undergo feed operation in the radial direction of the magneto-optical disc 1 mounted on the disc table 27 while being guided by the guide shafts 30 through the pick-up feed mechanism driven by feed motor (not shown) attached at the lower surfasce side of the chassis 21. A drive gear (not shown) is attached to the drive shaft of the feed motor for driving the pick-up feed mechanism. In addition, the drive gear is meshed with the reduction transmission gear (not shown) rotatably attached at the lower side of the chassis 21 constituting the pick-up feed mechanism. This reduction gear is meshed with a driven gear 32 attached to one end of a screw shaft 31 rotatably attached in parallel to the guide shafts 30 to rotate the screw shaft 31 about the axis through the driven gear 32. Further, the optical pick-up unit 24 is engaged with the screw shaft 31 by engaging an engagement pin 33 provided at the optical block portion. This optical pick-up unit 24 is moved along the guide shafts 30 when the feed motor is driven so that the screw shaft 31 is rotationally operated.

Moreover, on the cartridge loading portion 20 constituted on the upper surface side of the chassis 21, there are vertically provided positioning pins 34a, 34b for carrying out positioning of the loading position of the disc cartridge 2 loaded with respect to the loading portion 20. These positioning pins 34a, 34b are adapted so that when the disc cartridge 2 is loaded with respect to the cartridge loading portion 20, they are engaged with positioning holes 5a, 5b provided at the lower surface side of the cartridge body 5 to thereby carry out positioning of the disc cartridge 2 with respect to the cartridge loading portion 20. Further, at the cartridge loading portion 20, there are provided positioning projections 35a, 35b for carrying out positioning in a height direction of the disc cartridge 2. These positioning projections 35a, 35b come into contact with the lower surface of the disc cartridge 2 loaded with respect to the cartridge loading portion 20 to carry out positioning in the height direction of the disc cartridge 2.

In this example, a detection switch for detecting loading of the disc cartridge 2 is provided at one positioning projection 35a. At this detection switch, a pressing element is provided in a manner directed toward the upper surface of the chassis 21. In response to the fact that the pressing element is pushed down when the disc cartridge 2 is loaded with respect to the cartridge loading portion 20, the detection switch carries out detection of loading of the disc cartridge 2.

Moreover, at both sides of the back side opposite to the front side where the disc cartridge 2 is caused to undergo insertion/withdrawal of the chassis 21, there are attached a pair of supporting pieces 36a, 36b for rotatably supporting the cartridge holder 22 which holds the disc cartridge 2. At these supporting members 36a, 36b, support shafts 37 are projected. The cartridge holder 22 is rotatably supported through these support shafts 37.

Further, the cartridge holder 22 rotatably attached to the upper surface side of the chassis 21 includes, for the purpose of permitting the disc cartridge 2 to be held, a top plate portion 42, and a pair of cartridge holding portions 43a, 43b formed in a manner turned back on the both sides of the top plate portion 42 so as to take channel shape in cross section. This cartridge holder 22 is adapted so that when the disc cartridge 2 is inserted through an insertion/withdrawal hole 22a of the front side, it is held in the state where the front side and the back side of the disc cartridge 2 are supported by respective cartridge holding portions 43a, 43b.

At the middle portion of one cartridge holding portion 43b, a shutter opening piece 45 is projected toward the internal of the cartridge holder 22. This shutter opening piece 45 is adapted so that when the disc cartridge 2 is inserted into the cartridge holder 22, it is admitted into the movement guide groove 14 of the disc cartridge 2 to come into contact with the surface of the connection piece 13 of the shutter member 9 to allow the shutter member 9 to be placed in an opened state when the disc cartridge 2 is accommodated within the cartridge holder 22. Moreover, at the cartridge holder 22, axial holes 46 are bored at the backward portions of the cartridge holding portions 43a, 43b. These axial holes 46 are fitted with respect to the support shafts 37 provided at the back side of the chassis 21 to rotatably support the cartridge holder 22. Further, at the top plate portion 42 of the cartridge holder 22, there is opened a window portion 47 which is an opening portion for allowing a portion of the magnetic head device 23 to be admitted into the cartridge holder 22. In addition, at the other cartridge holding portion 43a of the cartridge holder 22, there is provided a lock piece 48 such that it is held by a portion of the chassis 21 to thereby allow the cartridge holder 22 to be placed in a closed state with respect to the chassis 21.

In the cartridge holder 22 constituted in this way, in the state rotated toward the upper side spaced from the cartridge loading portion 20 in the direction indicated by arrow $Y_1$ in FIG. 6, insertion/withdrawal of the disc cartridge 2 is carried out to hold the disc cartridge 2. On the other hand, when the cartridge holder 22 is rotated toward the lower side of the cartridge loading portion 20 side in the direction indicated by arrow $Y_2$ in FIG. 6, the disc cartridge 2 held therein is caused to be loaded with respect to the cartridge loading portion 20. The disc cartridge 2 loaded with respect to the cartridge loading portion 20 in this way is caused to undergo positioning by positioning pins 34a, 34b and positioning projections 35a, 35b, etc., resulting in the state where recording and/or reproduction can be made.

In addition, the magnetic head device 23 is connected to the optical pick-up unit 24 through a connection member 50 in a L-shaped form, and is attached thereto so that it is moved in one body with the optical pick-up unit 24.

Figure 7:
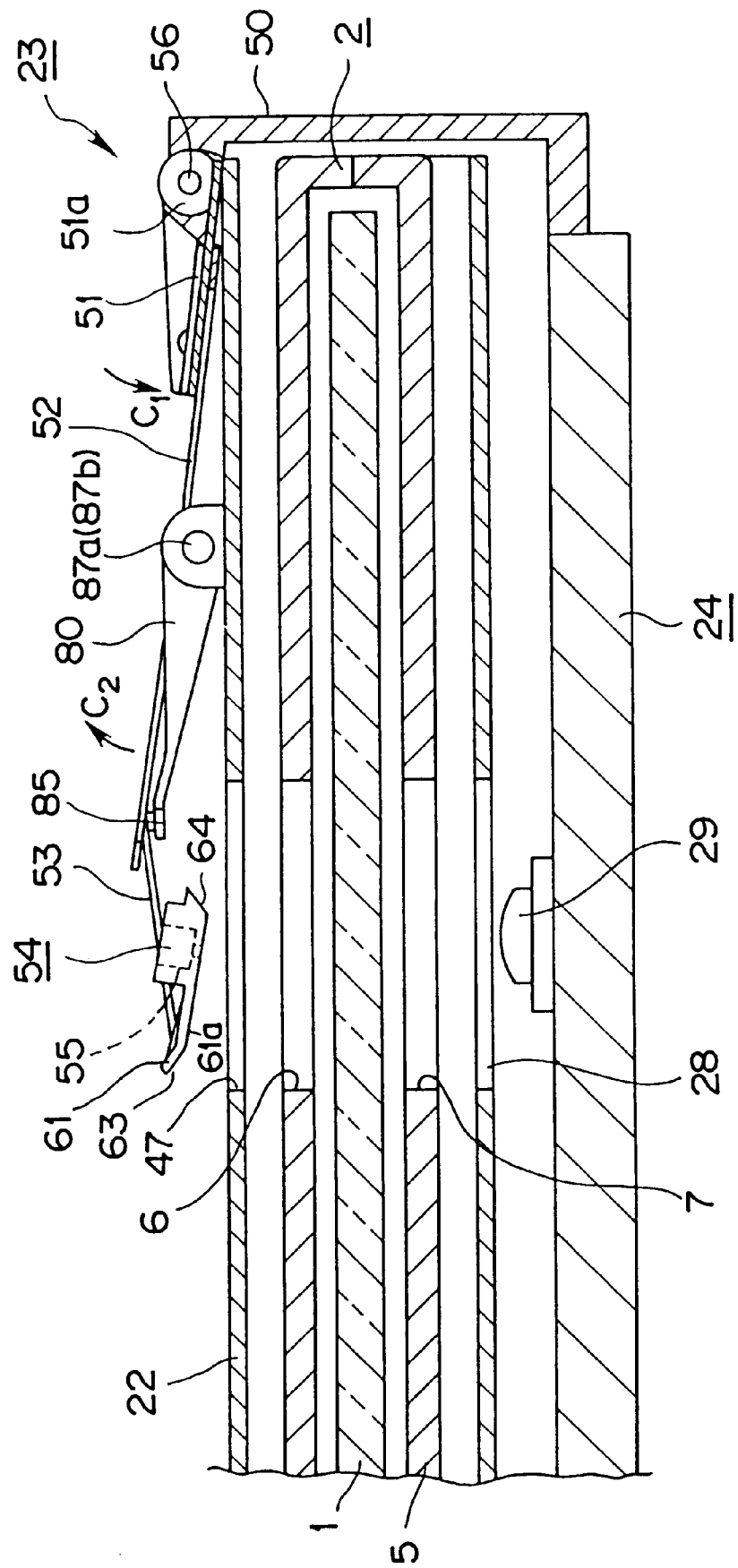
FIG. 7 is a cross sectional view showing the state where the magnetic head device is disposed at the recording/reproducing apparatus in a manner connected to optical pick-up, unit.
Figure 8:
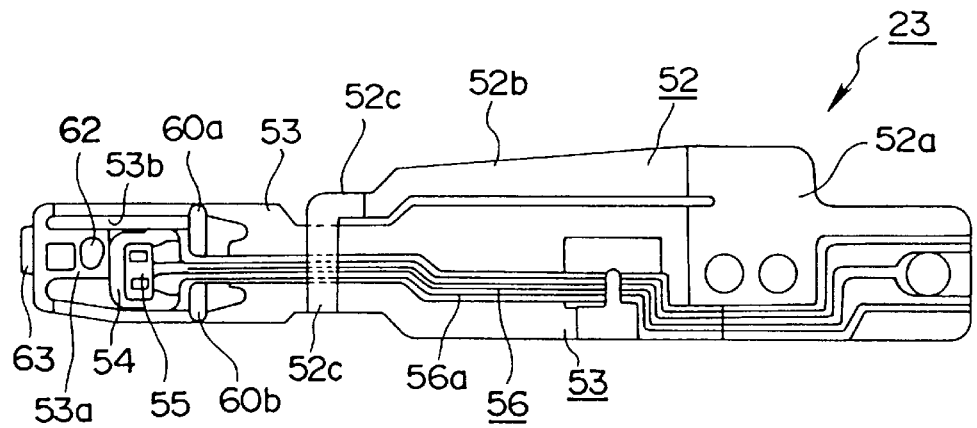
FIG. 8 is an essential part plan view of the magnetic head device.
Figure 9:
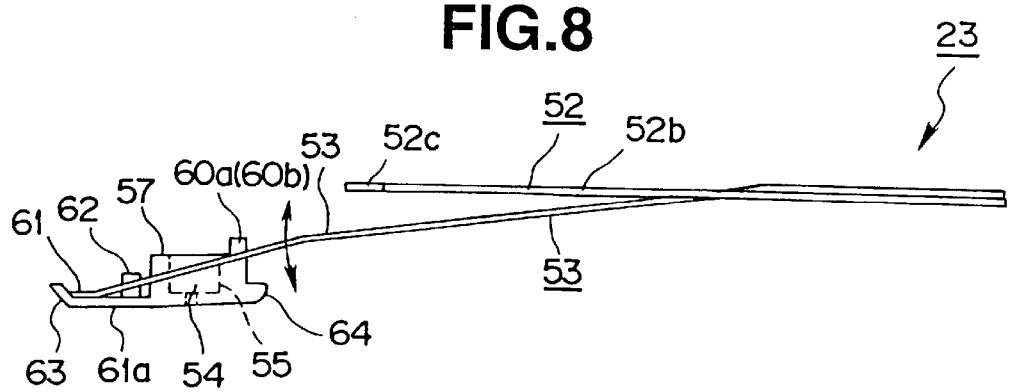
FIG. 9 is an essential part side view of the magnetic head device.

As shown in FIGS. 7, 8 and 9, this magnetic head device 23 is of a structure including, as main constituent members, a rotational supporting plate 51 adapted so that the base end portion side thereof is rotatably supported by the connection member 50 connected to the optical pick-up unit 24, a head supporting plate 53 adapted so that the base end portion side thereof is supported by the front end side of the rotational supporting plate 51, a rotation limiting plate 52 attached to the rotational supporting plate 51 so as to allow the base end portion thereof to overlap with the base end portion side of the head supporting plate 53 to limit the rotational position of the head supporting plate 53, and a slider 54 and a magnetic head 55 attached to the front end side of the head supporting plate 53.

Further, as shown in FIG. 7, the magnetic head device 23 is rotatably supported by the connection member 50 in a cantilever state through the rotational supporting plate 51. As shown in FIG. 7, the connection member 50 is adapted so that the lower end portion thereof is fixed at the carriage which is a portion of the optical pick-up unit 24, and the upper end portion thereof is extended up to the upper portion of the cartridge holder 22 along the back end portion of the chassis 21. A support shaft 56 is provided, as shown in FIGS. 6 and 7, at the free end portion of the upper side in the figure of the connection member 50, and serves to rotatably support the base end portion of the rotational supporting plate 51 constituting the magnetic head device 23.

The rotational supporting plate 51 by which the magnetic head device 23 is rotatably supported at the front end side of the connection member 50 is formed by metallic plate having rigidity so that it can be rotationally operated in a stable state in a manner to securely support the base end portion of the magnetic head device 23. This rotational supporting plate 51 is supported by the connection member 50 by allowing the support shaft 56 to be inserted into the portion between a pair of supporting pieces 51a formed in a rising manner (hereinafter simply referred to as rising-formed as occasion may demand) on the both sides of the base end portion side. In addition, the rotational supporting plate 51 is rotatably biased toward the cartridge loading potion 20 side in the direction indicated by arrow $C_1$ in FIG. 7 by means of torsion spring (not shown) wound on the support shaft 56 and stretched between the supporting pieces 51a and the connection member 50.

Further, the rotational limiting plate 52 connected in such a manner that the base end portion thereof is fixed to the front end side of the rotational supporting plate 51 is formed by metallic plate having elasticity to some degree. As shown in FIG. 8, plural penetration holes 52b are bored at an attachment portion 52a of the base end portion side. The rotational limiting plate 52 is attached to the front end side of the rotational supporting plate 51 after undergone positioning by allowing fixing screws inserted into these penetration holes 52b and projections projected on the rotational supporting plate 51 side to be engaged with the rotational limiting plate 52. At this rotational limiting plate 52, there is provided a supporting arm 52b extended from one side toward the front end side of the attachment portion 52a and adapted to limit rotational position of the head supporting plate 53 when the head supporting plate 53 is rotated in a manner away from the cartridge loading portion 20 thus to limit excessive displacement of the head supporting plate 53. At the front end portion of this supporting arm 52b, there is provided a supporting piece 52c bent in a direction perpendicular to the extending direction of the arm 52b. This supporting piece 52c extends in a manner opposite to the upper surface side of the head supporting plate 53 as described later to limit elastic displacement quantity of the head supporting plate 53.

Further, the head supporting plate 53 serving as a supporting member for supporting the magnetic head 55 is formed by thin metallic plate having elasticity, and is attached to the rotational supporting plate 51 serving as a fixed portion along with the head supporting plate 53 in such a manner that the base end portion side thereof overlaps with the head supporting plate 53. This head supporting plate 53 is adapted so that the slider 54 of relatively large mass is attached to the front end portion thereof as described later and serves to render (apply) elastic force sufficient to lightly touch the surface of the magneto-optical disc 1 to the slider 54. This head supporting plate 53 is slightly bent so as to take mountain shape with the central portion in the length direction being as vertex, and is adapted so that a slider attachment portion 53a is integrally formed at the front end portion thereof. This slider attachment portion 53a is formed by boring a cut portion 53b which takes substantially channel shape, as shown in FIG. 8, at the front end portion of the head supporting plate 53. Namely, the slider attachment portion 53a is formed as a tongue-shaped member extending from the front end portion side toward the base end side of the head supporting plate 53. The cut portion 53b bored for the purpose of forming this slider attachment portion 53a is formed by punching at the front end portion of the head supporting plate 53 with a cut width slightly broader than the width of a base portion (slider body) 57 of the slider 54 attached to the slider attachment portion 53a. The slider 54 is attached to the slider attachment potion 53a in a manner positioned within the cut portion 53b.

Figure 10:
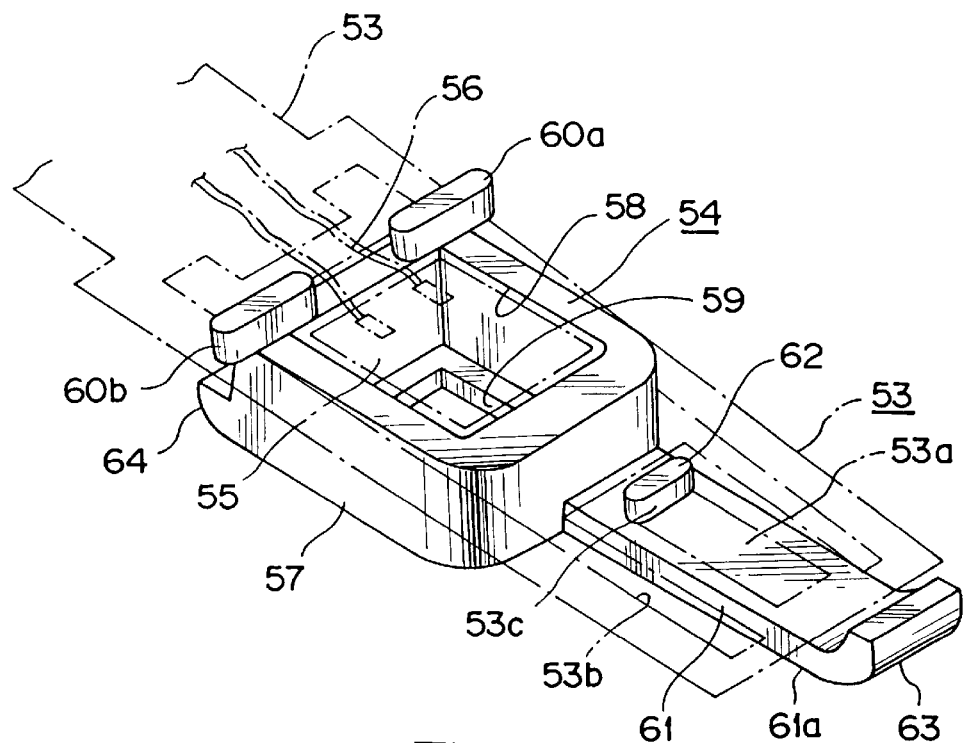
FIG. 10 is a perspective view showing slider to which magnetic head is attached.

Further, the slider 54 attached to the slider attachment portion 53a is molded by synthetic resin material having abrasion resistance, and is composed, as shown in FIG. 10, of a slider body 57 in a square tubular form having bottom where a recessed portion 58 for attachment of head chip is formed, and a disc slidable contact portion 61 integrally projected from the front end side of the slider body 57. The slider body 57 is formed so as to have a width slightly narrower than the width of the cut portion 53b provided for the purpose of forming the slider attachment portion 53a at the front end side of the head supporting plate 53, wherein the recessed portion 58 having bottom is provided at the central portion thereof. In addition, at the bottom portion of the recessed portion 58 provided at the slider body 57, there is opened an opening portion 59 for facing a portion of the magnetic head 55 attached within the recessed portion 58 to the external.

Further, at the slider body 57, there are integrally projected a pair of holding portions 60a, 60b respectively projected toward the lateral direction in the state positioned at the opening edge of the backward side of the recessed portion 58. These holding portions 60a, 60b are projected with a quantity of projection caused to be greater than the cut width of the cut portion 53b provided at the front end side of the above-described head supporting plate 53. Moreover, in the slider body 57, at bottom surface sides corresponding to the holding portions 60a, 60b, i.e., corner portions of the surface side opposite to the magneto-optical disc 1, a gentle inclined surface is provided over the entire area in the width direction as shown in FIGS. 9 and 10. This inclined surface is constituted as an inclined surface so as to allow the opposite interval (spacing) between the bottom surface portion of the slider 54 and the magneto-optical disc 1 to be gradually greater at a predetermined elevation angle with respect to a disc slidable contact surface 61a which is the bottom surface of the disc slidable contact portion 61 from the front end side toward the base end side of the slider body 57, and constitutes a second inclined guide surface 64 with respect to the disc cartridge 1 as described later.

Moreover, the disc slidable contact portion 61 projected at the front end side of the slider body 57 takes a substantially rectangular plate shape, wherein an engagement projection 62 is projected on the upper surface side thereof. Further, in the disc slidable contact portion 61, the front end portion thereof is formed in a manner bent so as to take circular arc shape toward the upper direction, whereby the slidable contact surface 61a with respect to the magneto-optical disc 1 which is the bottom surface side thereof is formed as a gentle circular-arc shaped inclined surface. Namely, as shown in FIGS. 9 and 10, this inclined surface is constituted as an inclined surface so as to allow the opposite interval (spacing) between the disc slidable contact surface 61a of the disc slidable contact portion 61 and the magneto-optical disc 1 to be gradually greater from the front end side which is one end side toward the backward side, and constitutes a first inclined guide surface 63 with respect to the disc cartridge 1 as described later. Namely, this first inclined guide surface 63 is inclined so as to have a predetermined elevation angle with respect to the disc slidable contact surface 61a which is the bottom surface of the disc slidable contact portion 61 from one end side toward the other end side of the disc slidable contact portion 61.

In the slider 54 constituted as described above, the magnetic head 55 is fitted (assembled) within the recessed portion 58 of the slider body 57 in a manner to face the opposite surface with respect to the magneto-optical disc 1 to the opening portion 59. This magnetic head 55 is fixed within the recessed portion 58 by, e.g., epoxy resin, etc.

Further, as shown in FIG. 10, the slider 54 to which the magnetic head 55 is attached is attached to the front end portion of the head supporting plate 53 by allowing the slider body 57 to be fitted into the cut portion 53b. At this time, with respect to the head supporting plate 53, the front end portion of the head attachment portion 53a is in contact with the upper surface side of the disc slidable contact portion 61, and the engagement projection 62 is relatively engaged with an engagement hole 53c bored at the head attachment potion 53a. At this time, as the result of the fact that the holding portions 60a, 60b provided at the slider body 57 are held with respect to the both sides of the cut portion 53b from the upper surface side of the head supporting plate 53, even in the case where the slider 54 is placed in the state spaced from the magneto-optical disc 1, the slider 54 is supported by the head supporting plate 53 in the state where fluctuation is limited.

Namely, the slider 54 is attached to the front end side of the head supporting plate 53 in such a manner that it is held by the holding portions 60a, 60b in the state where the base end side of the slider attachment portion 53a is caused to slightly undergo elastic displacement, and its elastic force produced at the front end portion thereof is applied to the upper surface side of the disc slidable contact portion 61 and the engagement projection 62 is relatively engaged with the engagement hole 53c of the head attachment portion 53a.

Further, as shown in FIG. 8, the magnetic head 55 attached to the slider 54 is connected to control circuit board through a conductive pattern 56a provided on a flexible printed board 56 disposed on the upper surface of the head supporting plate 53.

As shown in FIG. 7, the magnetic head device 23 constituted as described above is adapted so that the rotational supporting plate 51 is rotatably supported in the state where it is cantilever-supported by the front end portion of the connection member 50, and the slider 54 which has supported the magnetic head 55 attached to the front end portion of the head supporting plate 53 is faced to the window portion 47 provided at the cartridge holder 22.

Further, by a vertical movement operation mechanism 70 disposed through the cartridge holder 22, the magnetic head device 23 is caused to undergo rotational operation within the range between a first position where the slider 54 attached at the front end portion of the head supporting plate 53 is caused to be close to the magneto-optical disc 1 loaded with respect to the cartridge loading portion 20 and a second position where it is caused to be away therefrom.

As shown in FIG. 6, this vertical movement operation mechanism 70 comprises a head vertical movement plate 80 for allowing the head supporting plate 53 of the magnetic head device 23 to undergo rotational operation, and an operation plate 81 caused to undergo movement operation by the drive motor to allow the head vertical movement plate 80 to undergo rotational operation. As shown in FIG. 6, the head vertical movement plate 80 is disposed at the upper surface side of the cartridge holder 22 in a manner laid across the window portion 47. This head vertical movement plate 80 comprises a head supporting portion 85 for supporting the head supporting plate 53 from the lower surface side, and supporting arms 86a, 86b projected on the both ends of the head supporting portion 85. Further, the head vertical movement plate 80 is adapted so that in the state where the base end portions of the supporting arms 86a, 86b are supported by shaft portions 87a, 87b provided at the backward side of the cartridge holder 22 and in the vicinity of the window portion 47, the head vertical movement plate 80 is rotatably disposed on the cartridge holder 22 with these shaft portions 87a, 87b being as the center.

Moreover, as shown in FIG. 6, the operation plate 81 for rotationally operating the head vertical movement plate 80 is disposed at the upper surface side of the cartridge holder 22 so that it can be moved. At one side of this operation plate 81, a cam piece 100 for allowing the head vertical movement plate 80 to undergo rotational operation in accordance with movement in the direction indicated by arrow $B_1$ or in the direction indicated by arrow $B_2$ in FIG. 6 is formed in a rising manner toward the upper direction. An operated piece 89 projected from the head vertical movement plate 80 is caused to be in contact with the cam piece 100 thereon.

Further, the operation plate 81 is moved in the direction indicated by arrow $B_2$ in FIG. 6 on the upper surface of the cartridge holder 22 by drive mechanism (not shown) disposed at the lower surface side of the chassis 21 to allow the cam piece 100 to push up the operated piece 89 to thereby rotate the head vertical movement plate 80 in the direction indicated by arrow $C_2$ in FIG. 7 to rotate, in the direction indicated by arrow $C_2$ in FIG. 7, the head supporting plate 53 of the magnetic head device 23 mounted on the head vertical movement plate 80. Namely, the rotational supporting plate 51 which has supported the head supporting plate 53 is rotated against biasing force of the torsion spring, whereby the head supporting plate 53 is rotated in the direction indicated by arrow $C_2$ in FIG. 7.

Moreover, the operation plate 81 is moved in the direction indicated by arrow $B_1$ in FIG. 6, and the operated piece 89 thus falls down along the cam piece 100 to rotate the head vertical movement plate 80 in the direction indicated by arrow $C_1$ in FIG. 7 to rotate, in the direction indicated by arrow $C_1$ in FIG. 7, the head supporting plate 53 mounted on the head vertical movement plate 80. Such rotation of the head supporting plate 53 is carried out by undergoing biasing force of the torsion spring for rotating and biasing the rotational supporting plate 51 which has supported the head supporting plate 53.

The state where the magnetic head device 23 is operated by the vertical movement operation mechanism 70 will now be described in more practical sense.

Figure 11:
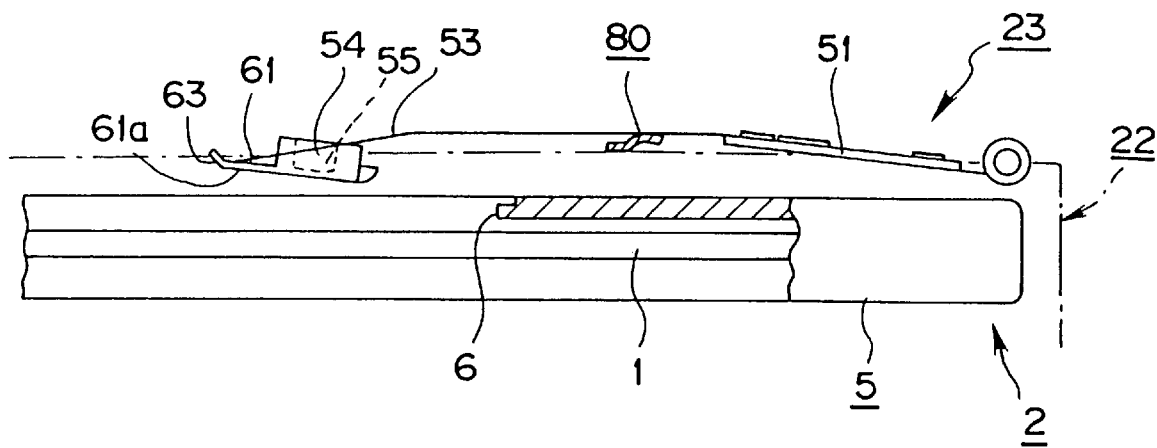
FIG. 11 is a side view showing the state where the magnetic head is moved to a second position spaced from the cartridge loading portion side.

This magnetic head device 23 is adapted so that when the operation mode of the recording/reproduction unit is set to the recording mode after the disc cartridge 2 is loaded with respect to the cartridge loading portion 20 within the unit body, the operation plate 81 is moved in the direction indicated by arrow $B_1$ in FIG. 6, and the operated piece 89 falls down along the cam piece 100 to rotate the head vertical movement plate 80 in the direction indicated by arrow $C_1$ in FIG. 7 to rotate, in the direction indicated by arrow $C_1$ in FIG. 7, the head supporting plate 53 mounted on the head vertical movement plate 80. By rotation of the head in the direction indicated by arrow $C_1$ in FIG. 7 of the head supporting plate 53, the slider 54 attached to the front end portion of the head supporting plate 53 moves in a direction close to the side of a first position where it becomes close to the magneto-optical disc 1 shown in FIG. 12 from a second position where it is spaced from the magneto-optical disc 1 within the disc cartridge 2 shown in FIG. 11. At this time, the slider 54 is admitted into the cartridge holder 22 through the window portion 47.

Figure 12:
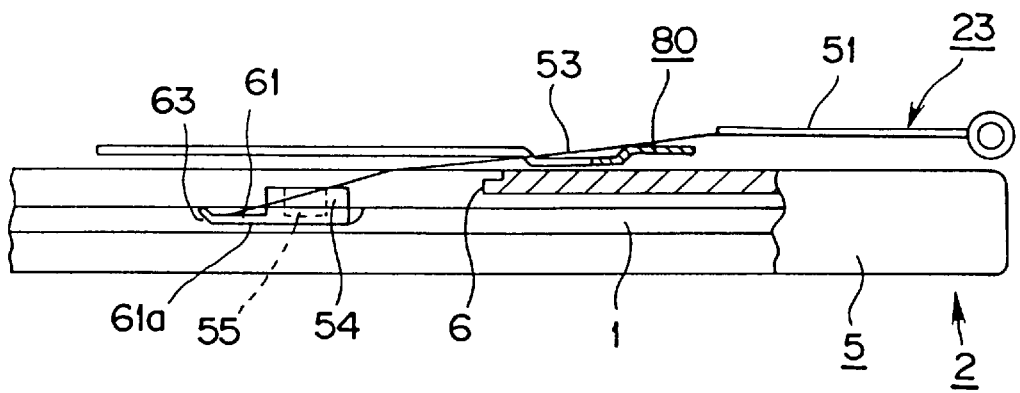
FIG. 12 is a side view showing the state where the magnetic head is moved to a first position close to the cartridge loading portion side.

Further, when the slider 54 is moved to the first position side where it is close to the magneto-optical disc 1, it is admitted into the cartridge body 5 from the opening portion 6 for recording as shown in FIG. 12, resulting in the state where the lower surface of the slider body 57 is lightly in contact with the surface of the magneto-optical disc 1. When the magneto-optical disc 1 is rotationally operated, the slider 54 floats from the surface of the magneto-optical disc 1 against biasing force of the head supporting plate 53 by action of air film (air flow) produced between the lower surface of the slider 54 and the surface of the magneto-optical disc 1, resulting in the state where the disc slidable contact surface 61a of the disc slidable contact portion 61 projected at the front end portion is caused to be lightly touched.

Further, light beams emitted from the optical pick-up unit 24 are irradiated to the position with which the magnetic head 55 attached to the slider 54 is slidably in contact. External magnetic field magnetically modulated in accordance with an information signal through the magnetic head 55 is applied to the signal recording portion of the magneto-optical disc 1 in which coercive force is lost as the result of the fact that light beams are irradiated, whereby recording of the information signals with respect to the magneto-optical disc 1 is carried out. The magnetic field from the magnetic head 55 is applied to the magneto-optical disc 1 through the opening portion 59 provided at the slider 54.

Meanwhile, when the magnetic head device 23 is in the state where the disc cartridge 2 is not loaded with respect to the cartridge loading portion 20, or in the state where the operation mode of the recording/reproduction unit is not set to the recording mode, the head supporting plate 53 is pushed up by the vertical movement operation mechanism 70 so that the slider 54 is caused to be placed at the second position spaced from the cartridge loading portion 20. At this time, in this recording/reproduction unit, the spacing (distance) between the slider 54 to which the magnetic head 55 is attached and the cartridge loading portion 20 is set to an extremely small value. Namely, in the recording/reproduction unit, there is employed the configuration that quantity of pushing-up of the magnetic head device 23 by the vertical movement operation mechanism 70 is reduced to thereby to allow the unit to be of thin structure as a whole. For this reason, in the magnetic head device 23, there are instances where a portion of the slider 54 may be caused to be positioned within the area where the disc cartridge 2 is loaded of the cartridge loading portion 20 resulting from dimensional accuracy and/or assembling accuracy of respective constituent members, deformation by vibration or falling impact, etc. of the head supporting plate 53, and the like. Thus, there are instances where the slider 54 may collide with the end portion of the disc cartridge 2 loaded with respect to the cartridge loading portion 20. On the other hand, in the magnetic head device 23, in the case where the disc cartridge 2 is loaded with respect to the cartridge loading portion 20 in an inclined state, there are instances where the slider 54 may collide with the end portion of the disc cartridge 2.

In view of the above, in the magnetic head device 23 according to this invention, as previously described, the first inclined guide surface 63 is integrally formed at the front end portion side of the disc slidable contact portion 61 of the slider 54. Accordingly, the slider 54 is adapted so that also in the event that such a circumstance or situation where it collides with the disc cartridge 2 as described above takes place, it serves to rotate the head supporting plate 53 in an upper direction which is the direction to be away from the cartridge loading portion 20 while allowing the head supporting plate 53 to undergo elastic displacement by the action of the first inclined guide surface 63 according as the disc cartridge 2 is inserted into the cartridge loading portion 20. Such rotation of the slider 54 prevents that impact force of collision with the disc cartridge 2 or loading force thereof is exerted on the head supporting plate 53. Accordingly, in the magnetic head device 23, circumstances of deformation and/or breakage of constituent members such as the head supporting plate 53 and/or the slider 54, etc. are securely prevented. In addition, in the magnetic head device 23, occurrence of non-smooth movement or colliding phenomenon is prevented in loading operation of the disc cartridge 2.

On the other hand, the magnetic head device 23 is adapted so that when eject operation is carried out so that the disc cartridge 2 loaded with respect to the cartridge loading portion 20 is caused to undergo eject operation, the vertical movement operation mechanism 70 is caused to be operative (actuated) and the head supporting plate 53 is thus pushed up by the vertical movement operation plate 80 so that it is rotated in the direction of the second position away from the cartridge loading portion 20. In this instance, in the slider 54, there are instances where the bottom surface portion of the back end side of the slider body 57 may collide with the opening edge of the opening portion 6 of the cartridge body 5 by difference in timing between the rotational operation and the eject operation of the disc cartridge 2 and/or vibration of the head supporting plate 53, etc.

Meanwhile, as previously described, the second inclined guide surface 64 is integrally formed at the slider body 57 of the slider 54. Accordingly, the slider 54 carries out riding operation onto the surface of the cartridge body 5 from the opening edge of the opening portion 6 of the cartridge body 5 while allowing the head supporting plate 53 to undergo elastic displacement by the action of the second inclined guide surface 64 in a manner followed by the eject operation of the disc cartridge 2. This operation of the slider 54 prevents occurrence of non-smooth movement or colliding phenomenon of the disc cartridge 2 at the time of the eject operation, and prevents deformation and/or breakage of the head supporting plate 53.

It is to be noted that while, in the above-described magnetic head device 23, explanation has been given by taking the example of the so-called floating type magnetic head device such that the slider 54 to which the magnetic head 55 is attached is caused to flow by air flow produced by rotation of the magneto-optical disc 1, it is a matter of course that this invention may be applied also to a magnetic head device of a structure such that it slidably in contact with the surface of the magneto-optical disc 1 by elastic force of the head supporting plate 53 to carry out recording of information signals.

Moreover, while the first inclined guide surface 63 provided at the slider 54 is formed at the bottom surface side opposite to the magneto-optical disc 1 at the front end side of the disc slidable contact portion 61 integrally projected on the slider body 57, in the case of a structure in which the head supporting plate 53 is directly attached to the slider body 57 in a manner provided with no disc slidable contact portion 61, the first inclined guide surface 63 is formed at the front end portion of the bottom surface side of the slider body 57.

Further, the second inclined guide surface 64 functions exclusively with respect to prevention of non-smooth movement or collision at the time of the eject operation of the disc cartridge 2, but occurrence of inconvenience such as deformation or breakage of the head supporting plate 53 based on such function by the second inclined guide surface 64 takes place to a little degree. Accordingly, with respect to the second inclined guide surface 64, it is possible to cope with implementation thereof by providing a guide to such a degree to escape the thickness dimension of halves constituting the cartridge body at the bottom surface of the backward portion of the slider 54. For example, it is possible to cope with implementation of the second inclined guide surface 64 also by processing, e.g., chamfering, etc.

Furthermore, while the recording/reproduction unit uses the disc cartridge adapted so that the magneto-optical disc is rotatably accommodated within the cartridge body, it is a matter of course that there is employed a recording/reproduction unit adapted so that the magneto-optical disc is directly loaded therewithin.

In addition, this invention is applied to the head device provided with the structure in which the head or the slider to which such a head is attached is cantilever-supported by the supporting member so that it is moved in a direction close to the disc-shaped recording medium or in a direction away therefrom, and a recording and/or reproducing apparatus provided with such a head device, thereby making it possible to allow the recording and/or reproducing apparatus to be compact and to be of thin structure.

Industrial Applicability

The magnetic head device and the recording and/or reproducing apparatus according to this invention are adapted so that the guide portion provided in a manner inclined at a predetermined elevation angle from the other end side toward one end side of the supporting member is provided at the cantileversupported slider to which the head is attached so that it is moved in the direction close to the disc-shaped recording medium or in the direction away therefrom. For this reason, even if the distance between the loading portion where the disc-shaped recording medium is loaded and the slider is small, collision between the disc-shaped recording medium inserted into the loading portion and withdrawn therefrom and the slider or the head can be securely avoided. Accordingly, protection of the disc-shaped recording medium and the slider or the head can be realized. In addition, loading/withdrawal of the disc-shaped recording medium is securely realized while allowing quantity of movement with respect to the disc-shaped recording medium loaded with respect to the loading portion of the recording medium of the slider or the head to be small, thus to realize thin structure and miniaturization of the recording/reproducing apparatus itself.

I claim:

1. A magnetic head device for use with a recording and/or reproducing apparatus having a loading portion for loading a disc cartridge, comprising:

a magnetic head;

a slider to which the magnetic head is attached;

a supporting member to which the slider is provided at one end side thereof, and the other end side thereof being attached to a fixed portion; and guide means provided as a front end of the slider, said guide means being inclined at a predetermined elevation angle from said other end side toward said one end side of the supporting member and wherein said guide means moves the magnetic head device away from the loading portion when the disc cartridge is being loaded.

2. A magnetic head device as set forth in claim 1, wherein the guide means includes a further inclined surface inclined at a predetermined elevation angle from said one end side toward said other end side of the supporting member.

3. A magnetic head device for use with a recording and/or reproducing apparatus having a loading portion for loading a disc cartridge comprising:

a magnetic head;

a slider to which the magnetic head is attached;

a supporting member to which the slider is provided at one end side thereof, and the other end side thereof being attached to a fixed portion; and guide means provided at the slider, said guide means being inclined at a predetermined elevation angle from said other end side toward said one end side of the supporting member and wherein said guide means moves the magnetic head device away from the loading portion when the disc cartridge is being loaded, wherein the slider is constituted by a holding portion for holding the magnetic head and a projecting portion in which the inclined guide means is formed at a front end portion thereof, the projecting portion projecting from said other end side toward said one end side of the supporting member from the holding portion.

4. A magnetic head device as set forth in claim 3,
wherein the supporting member is constituted by an attachment portion to which the slider is attached and a supporting portion formed integrally with the attachment portion, the protecting portion projecting from the supporting portion.

5. A magnetic head device as set forth in claim 4,
wherein the supporting member is such that the attachment portion and the supporting portion are integrally formed by using a plate-shaped member having elasticity.

6. A magnetic head device as set forth in claim 3,
wherein the slider is attached to an attachment portion so that the holding portion projects lower than the projecting portion.

7. A recording and/or reproducing apparatus for a disc-shaped recording medium, comprising:
a slider to which a head is attached;
a supporting member to which the slider is attached at one end side thereof and the other end side thereof being attached to a fixed portion, and the head attached to the slider is moved between a first position close to the disc-shaped recording medium and a second position away from the disc-shaped recording medium; and
inclined guide means provided as a front end of the slider such that when the disc-shaped recording medium is inserted into an apparatus body, the guide means comes into contact with the disc-shaped recording medium to move the supporting member toward the second position.

8. A recording and/or reproducing apparatus for a disc-shaped recording medium as set forth in claim 7,
wherein the guide means includes an inclined surface inclined in a direction away from the disc-shaped recording medium from said other end side toward said one end side of the supporting member.

9. A recording and/or reproducing apparatus for a disc-shaped recording medium as set forth in claim 7,
wherein the guide means includes a further inclined surface inclined at a predetermined elevation angle from said one end side toward said other end side of the supporting member.

10. A recording and/or reproducing apparatus for a disc-shaped recording medium as set forth in claim 7,
wherein the apparatus further comprises recording and/or reproduction means for carrying out recording and/or reproduction with respect to the disc-shaped recording medium, and a holder moving in the state where it holds the disc-shaped recording medium inserted into the apparatus body to allow the disc-shaped recording medium to undergo loading with respect to the recording and/or reproduction means, and an opening portion to which the magnetic head and/or the slider are faced being formed in the holder.

11. A recording and/or reproducing apparatus for a disc-shaped recording medium as set forth in claim 10,
wherein the supporting means is adapted so that when the disc-shaped recording medium is loaded with respect to the recording and/or reproduction means by the holder, the guide means is positioned within the holder and the disc-shaped recording medium is in contact with the guide means through the opening portion, due to the supporting means being rotated toward the first position, while when the disc-shaped recording medium loaded with respect to the recording and/or reproduction means is ejected by the holder, the supporting means is rotated toward the second position in accordance with movement of the holder.

12. A recording and/or reproducing apparatus for a disc-shaped recording medium, comprising:
a slider to which a head is attached;
a supporting member to which the slider is attached at one end side thereof and the other end side thereof being attached to a fixed portion, and the head attached to the slider is moved between a first position close to the disc-shaped recording medium and a second position away from the disc-shaped recording medium; and
inclined guide means Provided at a front end portion of the slider such that when the disc-shaped recording medium is inserted into an apparatus body, the guide means comes into contact with the disc-shaped recording medium to move the supporting member toward the second position and wherein the guide means includes an inclined surface inclined in a direction away from the disc-shaped recording medium from said other end side toward said one end side of the supporting member and wherein the slider is constituted by a holding portion for holding the magnetic head and a projecting portion where the inclined surface is formed at a front end portion thereof, the projecting portion being formed to project from said other end side toward said one end side of the supporting member from the holding portion.

13. A recording and/or reproducing apparatus for a disc-shaped recording medium as set forth in claim 12,
wherein the supporting member is constituted by an attachment portion to which the slider is attached and a supporting portion formed integrally with the attachment portion, the projecting portion being formed to project from the supporting portion.

14. A recording and/or reproducing apparatus for a disc-shaped recording medium as set forth in claim 13,
wherein the slider is attached to the attachment portion in such a manner that the holding portion projects in a lower direction than the projecting portion.

* * * * *